United States Patent
Sasaki et al.

(10) Patent No.: US 11,999,880 B2
(45) Date of Patent: Jun. 4, 2024

(54) HOT MELT ADHESIVE SHEET AND DECORATIVE SHEET WITH ADHESIVE LAYER

(71) Applicants: Nitto Shinko Corporation, Sakai (JP); NITTO DENKO CORPORATION, Ibaraki (JP)

(72) Inventors: Kayoko Sasaki, Sakai (JP); Takafumi Hida, Ibaraki (JP); Shota Tanaka, Ibaraki (JP)

(73) Assignees: NITTO SHINKO CORPORATION, Sakai (JP); NITTO DENKO CORPORATION, Ibaraki (JP)

(*) Notice: Subject to any disclaimer, the term of this patent is extended or adjusted under 35 U.S.C. 154(b) by 900 days.

(21) Appl. No.: 16/971,538

(22) PCT Filed: Feb. 20, 2019

(86) PCT No.: PCT/JP2019/006260
§ 371 (c)(1),
(2) Date: Aug. 20, 2020

(87) PCT Pub. No.: WO2019/163812
PCT Pub. Date: Aug. 29, 2019

(65) Prior Publication Data
US 2021/0079275 A1    Mar. 18, 2021

(30) Foreign Application Priority Data
Feb. 22, 2018 (JP) .................................. 2018-029500

(51) Int. Cl.
| C09J 125/08 | (2006.01) |
| B32B 7/12 | (2006.01) |
| B32B 27/28 | (2006.01) |
| B32B 27/30 | (2006.01) |
| B32B 27/32 | (2006.01) |
| C09J 7/20 | (2018.01) |
| C09J 7/30 | (2018.01) |
| C09J 7/35 | (2018.01) |
| C09J 11/06 | (2006.01) |
| C09J 11/08 | (2006.01) |
| C09J 153/02 | (2006.01) |

(52) U.S. Cl.
CPC .............. *C09J 153/02* (2013.01); *B32B 7/12* (2013.01); *B32B 27/302* (2013.01); *B32B 27/32* (2013.01); *C09J 7/20* (2018.01); *C09J 7/35* (2018.01); *C09J 11/06* (2013.01); *C09J 11/08* (2013.01); *B32B 2250/02* (2013.01); *B32B 2250/24* (2013.01); *B32B 2451/00* (2013.01)

(58) Field of Classification Search
None
See application file for complete search history.

(56) References Cited

U.S. PATENT DOCUMENTS

| 5,223,315 | A | 6/1993 | Katsura et al. |
| 6,433,069 | B1* | 8/2002 | Oeltjen ................. C09J 153/02 524/505 |
| 7,838,590 | B2* | 11/2010 | Kanderski ................ B32B 7/12 524/505 |
| 2008/0306214 | A1 | 12/2008 | Kanderski |
| 2009/0324940 | A1 | 12/2009 | Bohm et al. |
| 2010/0193127 | A1* | 8/2010 | Fouquay ................ B32B 27/32 524/285 |
| 2011/0281045 | A1* | 11/2011 | Goubard ................ B32B 27/32 524/505 |
| 2019/0040289 | A1 | 2/2019 | Dobashi et al. |
| 2022/0145142 | A1 | 5/2022 | Dobashi et al. |
| 2022/0282136 | A1* | 9/2022 | Fujii ..................... C09J 153/02 |

FOREIGN PATENT DOCUMENTS

| CN | 101495589 A | 7/2009 |
| CN | 101688101 A | 3/2010 |
| CN | 103694909 A | 4/2014 |
| EP | 1196511 B1 | 1/2004 |
| JP | 3-79684 A | 4/1991 |
| JP | H10-88097 A | 4/1998 |
| JP | 2919385 A | 7/1999 |
| JP | 2002-523609 A | 7/2002 |
| JP | 2004-075842 A | 3/2004 |
| JP | 2006-143870 A | 6/2006 |
| JP | 2008-89863 A | 4/2008 |
| JP | 5434046 B2 | 3/2014 |
| JP | 2017-214479 A | 12/2017 |
| WO | 00/12645 A1 | 3/2000 |
| WO | 2017209309 A1 | 12/2017 |

OTHER PUBLICATIONS

Office Action dated Feb. 18, 2022, issued in counterpart JP Application No. 2018-029500, with English Translation. (8 pages).
International Search Report dated May 7, 2019, issued in counterpart International Application No. PCT/JP2019/006260. (2 pages).
Office Action dated Jun. 2, 2022, issued in counterpart CN Application No. 201980014450.7, with English Translation. (12 pages).
Extended (Supplementary) European Search Report dated Sep. 20, 2021, issued in counterpart EP Application No. 19757156.5. (5 pages).
Office Action dated Oct. 15, 2021, issued in counterpart CN Application No. 201980014450.7, with English translation. (8 pages).
Office Action dated Nov. 22, 2021, issued in counterpart JP Application No. 2018-029500, with English translation. (8 pages).

(Continued)

*Primary Examiner* — Michael J Feely
(74) *Attorney, Agent, or Firm* — WHDA, LLP

(57) ABSTRACT

Provided is a hot melt adhesive sheet comprising a hot melt adhesive that comprises a styrene-based block copolymer and a tackifier, in which the styrene-based block copolymer comprises a hard segment composed of a polystyrene block and a soft segment composed of a constituent unit derived from propylene.

5 Claims, 1 Drawing Sheet

(56) References Cited

OTHER PUBLICATIONS

Office Action dated Mar. 15, 2023, issued in counterpart KR Application No. 2020-7023705, with English translation. (8 pages).
Office Action dated Nov. 21, 2022, issued in counterpart CN Application No. 201980014450.7, with English Translation. (11 pages).
Office Action dated Sep. 7, 2023, issued in counterpart KR Application No. 10-2020-7023705, with English translation. (8 pages).

* cited by examiner

HOT MELT ADHESIVE SHEET AND DECORATIVE SHEET WITH ADHESIVE LAYER

CROSS-REFERENCE TO RELATED APPLICATION

This application claims priority to Japanese Patent Application No. 2018-029500, the disclosure of which is incorporated herein by reference in its entirety.

FIELD

The present invention relates to a hot melt adhesive sheet and a decorative sheet with adhesive layer. More specifically, the present invention relates to a hot melt adhesive sheet including an adhesive layer constituted of a hot melt adhesive, and a decorative sheet with adhesive layer including an adhesive layer constituted of a hot melt adhesive.

BACKGROUND

Conventionally, industrial products have been elaborately designed in various ways in order to improve the aesthetic appearance. Known elaborations of this kind include elaboration on the shape aspect, such as the entire shape or the partial shape, and elaboration on the surface design.

Specifically, attempts have been conventionally made to improve the aesthetic appearance of products by applying elaborate shapes to the products, or applying patterns or colors to the surfaces of the products. Known techniques for applying patterns or colors include a technique of applying coating materials or the like, and a technique of applying sheet-shaped surface decorative materials with given designs to the surfaces of products. As the surface decorative material used for such a purpose, an decorative sheet with adhesive layer composed of a decorative sheet with, for example, given patterns, colors or recess and projection patterns applied thereon, and an adhesive layer layered on one side of the decorative sheet has been conventionally utilized. Examples of a known type of the decorative sheet with adhesive layer includes a decorative sheet in which an adhesive layer constituted of a hot melt adhesive is layered on a hologram laminate, as shown in Patent Literature 1 below.

CITATION LIST

Patent Literature

Patent Literature 1: JP 2008-089863 A

SUMMARY

Technical Problem

It is widely known that a hot melt adhesive sheet that includes only an adhesive layer constituted of a hot melt adhesive, or a hot melt adhesive sheet that includes an adhesive layer constituted of a hot melt adhesive provided on each of both sides of a base sheet, not only serves to constitute the adhesive layer for the aforementioned decorative sheet with adhesive layer, but also serves as adhesive means between parts or members. Meanwhile, the aforementioned hot melt adhesive sheet has a problem of hardly exhibiting good adhesion to an adherend made of a polyolefin-based resin such as a polypropylene resin or a polyethylene resin. Thus, in the case where the decorative sheet with adhesive layer as described above is employed as a surface decorative material for decorating a molded article formed of a resin composition including a polyolefin-based resin, the decorative sheet with adhesive layer is easily peeled off from the surface of the molded article. Thus, the aforementioned decorative sheet with adhesive layer has a problem of being applicable only to the limited area of the field. Such a problem may occur not only in decorating the surface of the resin molded article but also in the hot melt adhesive sheet utilized only to adhere members or parts together. Therefore, it is an object of the present invention to solve such a problem, to provide a hot melt adhesive sheet that exhibits excellent adhesion to an adherend even if the adherend is, for example, a molded article formed of a polyolefin-based resin, and to provide a decorative sheet with adhesive layer that is applicable to a wide range of products.

Solution to Problem

In order to solve the aforementioned problems, the present invention provides a hot melt adhesive sheet comprising an adhesive layer comprising a hot melt adhesive, wherein the hot melt adhesive comprises a styrene-based block copolymer and a tackifier, and the styrene-based block copolymer comprises a hard segment composed of a polystyrene block and a soft segment composed of a constituent unit derived from propylene.

Further, in order to solve the aforementioned problems, the present invention provides a decorative sheet with adhesive layer having an adhesive layer formed on one side of a decorative sheet, wherein the adhesive layer comprises a hot melt adhesive, the hot melt adhesive comprises a styrene-based block copolymer and a tackifier, and the styrene-based block copolymer comprises a hard segment composed of a polystyrene block and a soft segment composed of a constituent unit derived from propylene.

DESCRIPTION OF EMBODIMENTS

Figure 1:
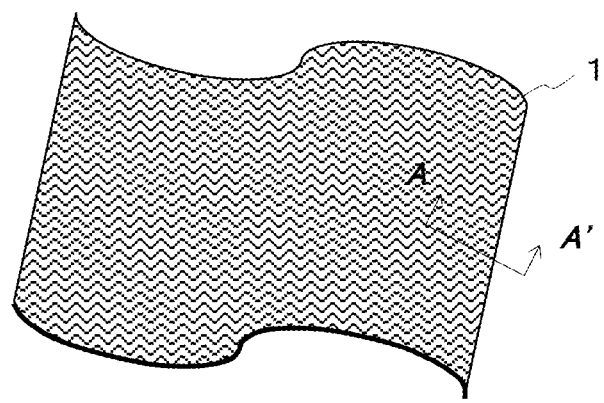
FIG. 1 is a schematic perspective view showing an external appearance of a decorative sheet with adhesive layer in which a hot melt adhesive sheet is used in forming the adhesive layer.
Figure 2:
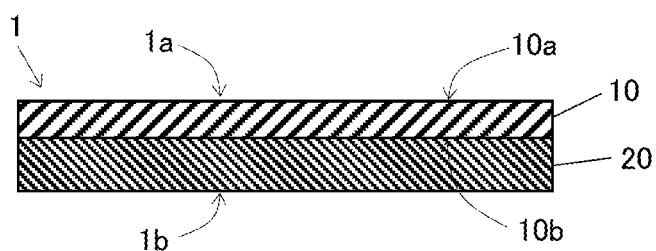
FIG. 2 is a schematic sectional view showing an appearance in cross section as viewed in the direction of arrows of A-A' in FIG. 1.

Hereinafter, preferred embodiments of the present invention will be described. The description will be made for the hot melt adhesive sheet of the present invention by taking, for example the case where it is utilized for forming an adhesive layer of a decorative sheet with adhesive layer. As shown in the drawings, a decorative sheet with adhesive layer 1 of this embodiment includes a decorative sheet 10 and an adhesive layer 20 formed on one side of the decorative sheet 10. The adhesive layer 20 of this embodiment is constituted of a hot melt adhesive sheet. The decorative sheet 10 includes a first surface 10a and a second surface 10b that is opposite to the first surface 10a, in which the hot melt adhesive sheet is adhered to the second surface 10b.

That is, the adhesive layer 20 is formed on the side of the second surface of the decorative sheet 10.

In the decorative sheet with adhesive layer 1 of this embodiment, the second surface 10b of the decorative sheet 10 is covered with the hot melt adhesive sheet. On the other hand, in the decorative sheet with adhesive layer 1 of this embodiment, the first surface 10a of the decorative sheet 10 is not covered with any other member while being exposed to the outside. According to the above configuration, the decorative sheet with adhesive layer 1 of this embodiment includes a first surface 1a on which a decorative feature possessed by the decorative sheet 10 appears (a face formed by the first surface 10a of the decorative sheet 10), and a second surface 1b composed of the hot-melt adhesive sheet, in which the second surface 1b serves as an adhesive face used for adhesion to an adherend.

The decorative sheet with adhesive layer 1 is used, for example, to impart a texture different from the texture of the material itself of a resin molded article by being adhered to the surface of the resin molded article. The decorative sheet with adhesive layer 1 in this embodiment can exhibit good adhesion even if an opposite material (adherend) to be decorated is other than a resin molded article. However, a hot melt adhesive included in the adhesive layer 20 of the decorative sheet with adhesive layer 1 in this embodiment also exhibits good adhesion to an adherend made of a polyolefin-based resin, to which good adhesion was hardly exhibited by a conventional hot melt adhesive, as described later. Thus, the decorative sheet with adhesive layer 1 of this embodiment is preferably used for adhesion to an adherend in which at least a surface of the adherend, to which the adhesive layer 20 is adhered, is composed of a resin composition including a polyolefin-based resin in order to exhibit its effect more significantly. In particular, the decorative sheet with adhesive layer 1 of this embodiment is preferably used for adhesion to an adherend in which at least a surface of the adherend, to which the adhesive layer 20 is adhered, is composed of a resin composition including a polypropylene resin.

Among polyolefin-based resins, particularly, a polypropylene resin hardly shows good adhesion to hot melt adhesives. On the other hand, a polypropylene resin has a relatively high thermal deformation temperature among polyolefin-based resins. Here, the decorative sheet with adhesive layer 1 of this embodiment, which is configured to not only allow the hot melt adhesive included in the adhesive layer 20 to exhibit excellent adhesion to the polypropylene resin, but also have the surface of the adherend composed of a resin composition including a polypropylene resin, enables thermal adhesion to be performed at a high temperature at the time of adhesion to the adherend. Thus, the decorative sheet with adhesive layer 1 of this embodiment can exhibit particularly excellent adhesion by being used for adhesion to an adherend in which at least a surface of the adherend, to which the adhesive layer 20 is adhered, is composed of a resin composition including a polypropylene resin. Further, the decorative sheet with the adhesive layer 1, which has been adhered to the adherend, exhibits high peel strength against the adherend, and is hardly peeled off from the adherend. Therefore, an excellent aesthetic appearance can be constantly exhibited for a long time in a product subjected to decoration with the decorative sheet with adhesive layer 1.

The decoration of the decorative sheet 10 appearing on the side of the first surface may be made with a chromatic or achromatic color, and may be made with a solid color, a pattern, or the like. The pattern may be composed of a design such as a graphic or letter, or may be a regular or irregular pattern. The design or the pattern may be represented with different colors, shades of colors, glazing, or the like, or may be represented by forming recesses and projections on a surface such as emboss processing or the like.

The decorative sheet 10 may have a single layer structure of a polymer sheet such as a rubber sheet or a plastic sheet; a polymer foam sheet such as a rubber foam sheet or a plastic foam sheet; a metal sheet made of such as an aluminum foil or a gold foil; a fiber sheet made of such as a woven fabric or a nonwoven fabric; a leather sheet made of such as synthetic leather or natural leather; or a sheet other than these sheets, or may have a laminated structure in which these sheets are laminated with each other.

The decorative sheet 10 may generally have a thickness of 1 μm or more and 10 mm or less. The thickness of the decorative sheet 10 is determined as an arithmetic average value when the thicknesses of several points (for example, 10 points) are measured by a micrometer.

The adhesive layer 20 may have a single layer structure or a laminated structure as in the case of the decorative sheet 10. The adhesive layer 20 in this embodiment has a single layer structure formed of a hot melt adhesive. The adhesive layer 20 may generally have a thickness of 10 μm or more and 2 mm or less. The thickness of the adhesive layer 20 may be determined in the same manner as the thickness of the decorative sheet 10.

The hot melt adhesive constituting the adhesive layer 20 includes a styrene-based block copolymer and a tackifier. The styrene-based block copolymer in this embodiment comprises a hard segment composed of a polystyrene block and a soft segment composed of a constituent unit derived from propylene.

The styrene-based block copolymer may be an A-B type diblock polymer composed of a hard segment (A) and a soft segment (B). The styrene-based block copolymer may be an A-B-A type triblock polymer in which both ends of a basic molecular structure are composed of hard segments (A), and one soft segment is provided between the hard segments. Further, the styrene-based block copolymer may be a multi-block polymer having an equal or larger number of blocks than an A-B-A-B type tetrablock polymer. Examples of the styrene-based block copolymer include a hydride (styrene-ethylene-propylene copolymer (SPR)) of a styrene-isoprene block copolymer (SI), a hydride (styrene-ethylene-propylene-styrene block copolymer (SEPS)) of a styrene-isoprene-styrene block copolymer (SIPS), and a hydride (styrene-ethylene-ethylene-propylene-styrene block copolymer (SEEPS)) of a styrene-butadiene-isoprene-styrene block copolymer (SIPBS). In order to allow the adhesive layer 20 to exhibit excellent adhesion to a polyolefin-based resin such as a polypropylene resin, the styrene-based block copolymer in this embodiment preferably has polystyrene blocks on both ends of the basic structure, and the soft segment between these two polystyrene blocks. Therefore, the styrene-based block copolymer in this embodiment is preferably either a styrene-ethylene-propylene-styrene block copolymer (SEPS) or a styrene-ethylene-ethylene-propylene-styrene block copolymer (SEEPS).

The styrene-based block copolymer preferably includes a hard segment at a ratio equal to or higher than a certain ratio in terms of enabling the adhesive layer 20 to exhibit a high cohesive force. On the other hand, the content of the hard segment in the styrene-based block copolymer is preferably equal to or less than a certain value since the affinity for a polyolefin-based resin such as a polypropylene resin is mainly exhibited by a soft segment. More specifically, a styrene content (based on mass) in the styrene-based block copolymer is 15% or more, more preferably 18% or more, particularly preferably 20% or more. The styrene-based block copolymer is preferably 40% or less, more preferably 35% or less, particularly preferably 32% or less.

In the styrene-based block copolymer, a mass average molecular weight determined by gel permeation chromatography measurement (GPC) in terms of styrene is preferably 100,000 or more, more preferably 150,000 or more. The mass average molecular weight of the styrene-based block copolymer is preferably 400,000 or less, more preferably 380,000 or less.

As the tackifier employed, together with the styrene-based block copolymer, as a constituent material of the hot melt adhesive, for example, a rosin resin, a terpene resin, a petroleum resin, an alkylphenol resin, or a xylene resin can be employed. The aforementioned resin employable as the tackifier may be a resin in which a degree of unsaturated bonding is adjusted by hydrogenation, or may be a resin in which a degree of unsaturation bonding remains unchanged without being subjected to hydrogenation. The aforementioned rosin-based resin may be, for example, a modified product which is so called as a polymerized rosin resin or a disproportionated rosin resin. Examples of the terpene-based resin include a terpene resin, a terpene phenol resin, an aromatic modified terpene resin, and a hydrogenated product thereof. The tackifier in this embodiment is preferably subjected to hydrogenation. In order to allow the hot melt adhesive to exhibit excellent adhesion to a polyolefin-based resin even at a high temperature, the tackifier in the hot melt adhesive is preferably a petroleum resin. In particular, the tackifier is preferably a hydrogenated aromatic petroleum resin. The aromatic petroleum resin is preferably hydrogenated to have an unsaturated bond sufficiently eliminated, and is preferably brought into a state that it can be referred to as an alicyclic saturated hydrocarbon resin. Specifically, in the aromatic petroleum resin, the iodine value measured according to JIS K 0070-1992 "test methods of acid value, saponification value, ester value, iodine value, hydroxyl value and unsaponifiable matter of chemical products" is preferably 15 g/100 or less, more preferably 10 g/100 or less.

The content of the tackifier when the content of the styrene-based block copolymer in the hot melt adhesive is 100 mass parts is preferably 70 mass parts or more, more preferably 75 mass parts or more, particularly preferably 80 mass parts or more. The content of the tackifier when the content of the styrene-based block copolymer in the hot melt adhesive is 100 mass parts is preferably 140 mass parts or less, more preferably 130 mass parts or less, particularly preferably 120 mass parts or less.

In order to allow the hot melt adhesive to more reliably exhibit excellent adhesion to the polyolefin-based resin, the ratio of the total mass of the styrene-based block copolymer and the tackifier to the hot melt adhesive in this embodiment is preferably 90% by mass or more, more preferably 95% by mass or more, particularly preferably 98% by mass or more.

Examples of components that can be included in the hot melt adhesive other than the styrene-based block copolymer and the tackifier include other polymers, an inorganic filler, and a chemical agent. Examples of the other polymers that may be included in the hot melt adhesive include a general thermoplastic resin and a general thermosetting resin. Examples of the inorganic filler include silicon oxide, aluminum oxide, silicon nitride, aluminum nitride, and boron nitride. Examples of the chemical agent include general plastic compounding agent such as an anti-aging agent, an antioxidant, a flame retardant, a filler, and a colorant.

The decorative sheet with adhesive layer 1 of this embodiment can be produced, for example, by a method in which a hot melt adhesive is formed into a sheet to produce a hot melt adhesive sheet composed solely of an adhesive layer as described above, and then the hot melt adhesive sheet and the decorative sheet 10 are adhered together. Also, the decorative sheet with adhesive layer 1 of this embodiment can be produced by, for example, a method in which a hot melt adhesive in a heated and molten state is applied to one side of the decorative sheet 10 to form an adhesive layer.

The hot melt adhesive sheet and the decorative sheet with adhesive layer according to this embodiment are configured as described above, and thus have the following advantages.

That is, the hot melt adhesive sheet according to this embodiment is a hot melt adhesive sheet comprising an adhesive layer comprising a hot melt adhesive, wherein the hot melt adhesive comprises a styrene-based block copolymer and a tackifier, and the styrene-based block copolymer comprises a hard segment composed of a polystyrene block and a soft segment composed of a constituent unit derived from propylene.

According to the hot melt adhesive sheet according to this embodiment, a hot melt adhesive sheet excellent in adhesion to a member or part made of a polyolefin-based resin can be provided.

The decorative sheet with adhesive layer according to this embodiment is a decorative sheet with adhesive layer having an adhesive layer formed on one side of a decorative sheet, wherein the adhesive layer comprises a hot melt adhesive, and the hot melt adhesive comprises a styrene-based block copolymer and a tackifier, and the styrene-based block copolymer comprises a hard segment composed of a polystyrene block and a soft segment composed of a constituent unit derived from propylene.

According to the decorative sheet with adhesive layer of this embodiment, a decorative sheet with adhesive layer excellent in adhesion to a product made of a polyolefin-based resin can be provided.

The hot melt adhesive sheet and the decorative sheet with adhesive layer according to the present invention are not limited to the aforementioned embodiment. Further, the hot melt adhesive sheet and the decorative sheet with adhesive layer according to the present invention are not limited by the aforementioned functions and effects. Various modifications can be made to the hot melt adhesive sheet and the decorative sheet with adhesive layer according to the present invention without departing from the gist of the present invention.

In this embodiment, the description for the usage example of the hot melt adhesive of the present invention was made by taking, for example, the case where the hot melt adhesive sheet of the present invention is used for forming the adhesive layer of the decorative sheet with adhesive layer, but the hot melt adhesive sheet of the present invention is not limited to the above exemplified application. That is, the hot melt adhesive sheet of the present invention is not only used in combination with a decorative sheet but also can be widely used as a sole unit of the adhesive sheet. The hot melt adhesive sheet of the present invention can be suitably used for adhering members or parts made of a polyolefin-based resin to each other. Thus, the hot melt adhesive sheet according to the present invention is not limited to the aforementioned exemplification.

EXAMPLES

Next, the present invention will be described in more detail by way of Examples, without limitation thereto.

Evaluation 1: Study on Styrene-Based Block Copolymers

Example 1-1

A styrene-ethylene-ethylene-propylene-styrene block copolymer (SEEPS) (mass average molecular weight: 260,000, styrene content: 30 mass %) which is a triblock polymer was prepared as a styrene-based block copolymer. As a tackifier, a hydrogenated aromatic petroleum resin (partially unsaturated bonds remained) was prepared. A sheet for evaluation simulating a decorative sheet with adhesive layer was prepared by forming an adhesive layer (thickness: about 40 μm) on one side of a stretched polypropylene resin film (thickness: 50 μm) simulating a decorative sheet, with a hot melt adhesive including a styrene-based block copolymer (I) and a tackifier (II) both described above in a mass ratio of 100:80 (I:II).

A strip-shaped sample having a width of 10 mm cut out from the sheet for evaluation was thermally-adhered to a surface of a polypropylene resin plate having a thickness of 3 mm, and sufficiently cooled to reach room temperature to produce a first test specimen for peel test. A strip-shaped sample having a width of 25 mm cut out from the sheet for evaluation was thermally-adhered to a surface of a polypropylene resin plate having a thickness of 3 mm, and sufficiently cooled to reach room temperature to produce a second test specimen for peel test. The peel test was performed in three ways.

(Test 1)

A 180 degree peel test was performed on the first test specimen using a tensile tester at a test speed of 200 mm/min in a room temperature environment. As a result, when the sheet for evaluation of Example 1-1 was used, a 180 degree peel strength of 15N/10 mm was observed.

(Test 2)

The first test specimen in a state of being heated at 80° C. was subjected to the 180 degree peel test in the same manner as Test 1. As a result, when the sheet for evaluation of Example 1-1 was used, a 180 degree peel strength of 6N/10 mm was observed.

(Test 3)

Figure 3:
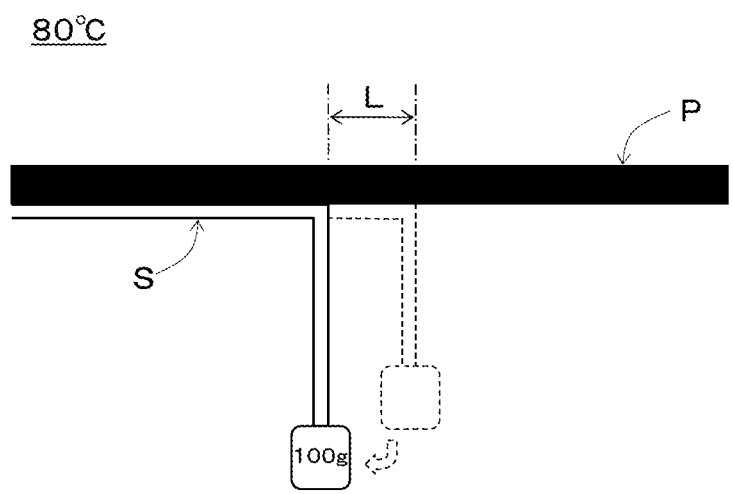
FIG. 3 is a schematic view showing a method for evaluating the adhesive strength of the hot melt adhesive sheet at high temperatures.

A strip-shaped sample of a certain length was peeled off from the second test specimen. As shown in FIG. 3, the polypropylene resin plate P was held horizontally to have the strip-shaped sample S located on the lower surface side of the polypropylene resin plate P, followed by attaching a load of 100 g to the end of the suspended strip-shaped sample S, and being held for 24 hours in an oven at 80° C., to determine the length (L) by which the sample has been peeled as compared with the initial state. As a result, when the sheet for evaluation of Example 1-1 was used, peeling did not proceed, and the peel length in the heating test at 80° C. for 24 hours was 0 mm.

Examples 1-2 to 1-8

Sheets for evaluation were prepared in the same manner as in Example 1-1 and evaluated in the same manner as in Example 1-1, except that the formulation of the hot melt adhesive was changed to those shown in a table below. Herein, evaluation was performed using a hydride (SPR) of a styrene-isoprene block copolymer (SI) in addition to SEEPS which is different in styrene content and mass average molecular weight from those used in Example 1-1.

Comparative Examples 1-1 to 1-3

Sheets for evaluation were produced in the same manner as in Example 1-1 and evaluated in the same manner as in Example 1-1, except that the formulation of the hot melt adhesive was changed to those shown in a table below. Herein, evaluation was performed using a styrene-ethylene-butylene-styrene block copolymer (SEBS) as a styrene-based block copolymer. The details thereof are as shown in Table 1.

Reference Example 1

A sheet for evaluation was prepared in the same manner as in Example 1-1 and evaluated in the same manner as in Example 1-1, except that polyisobutylene (PIB) (I') having a mass average molecular weight of 1,000,000 was used instead of the styrene-based block copolymer, and a hot melt adhesive having a mass ratio of the polyisobutylene and the tackifier (sufficiently hydrogenated aromatic petroleum resin (alicyclic saturated hydrocarbon resin)) (II') being 100:120 (I':II') was used for forming an adhesive layer.

Reference Example 2

A sheet for evaluation was prepared in the same manner as in Example 1-1 and evaluated in the same manner as in Example 1-1, except that an ethylene propylene diene rubber (EPDM) (I') having a mass average molecular weight of 300,000 was used instead of the styrene-based block copolymer, and a hot melt adhesive having a mass ratio of the ethylene propylene diene rubber and the tackifier (sufficiently hydrogenated aromatic petroleum resin (alicyclic saturated hydrocarbon resin)) (II') being 100:120 (I':II') was used for forming an adhesive layer.

TABLE 1

| | | SEEPS | | | | | | SEPS | SPR |
|---|---|---|---|---|---|---|---|---|---|
| | | Ex. 1-1 | Ex. 1-2 | Ex. 1-3 | Ex. 1-4 | Ex. 1-5 | Ex. 1-6 | Ex. 1-7 | Ex. 1-8 |
| Rubber component | Styrene ratio | 30% | 30% | 30% | 30% | 32% | 30% | 20% | 37% |
| | Molecular weight (×10^5) | 2.6 | 3.5 | 2.6 | 2.6 | 1.6 | 2.6 | 2.6 | 2.0 |
| | Number of added parts | 100 | 100 | 100 | 100 | 100 | 100 | 100 | 100 |
| Hydrogenated aromatic petroleum resin | Partially hydrogenated product (Softening point 115° C.) | 80 | 80 | — | — | — | — | — | — |
| | Fully hydrogenated product (Softening point 115° C.) | — | — | 80 | — | 120 | 120 | 120 | 120 |
| | Fully hydrogenated product (Softening point 125° C.) | — | — | — | 80 | — | — | — | — |

TABLE 1-continued

| | | | | | | | | | |
|---|---|---|---|---|---|---|---|---|---|
| Test1 | 180 degree peel strength@RT | 15 | 15 | 14 | 13 | 18 | 20 | 15 | 11.9 |
| Test2 | 180 degree peel strength@80° C. | 6 | 7 | 11 | 13 | 8 | 12 | 10 | 5.3 |
| Test3 | 90 degree peel@80° C. · 24 hr | 0 | 0 | 1 | 0 | 39 | 0 | 2 | ≥50 |

| | | SEBS | | | PIB | EPDM |
|---|---|---|---|---|---|---|
| | | Com.Ex. 1-1 | Com.Ex. 1-2 | Com.Ex. 1-3 | Ref.Ex. 1 | Ref.Ex. 2 |
| Rubber component | Styrene ratio | 30% | 30% | 30% | — | — |
| | Molecular weight (×10^5) | 0.5 | 0.7 | 1.5 | 10.0 | 3.0 |
| | Number of added parts | 100 | 100 | 100 | 100 | 100 |
| Hydrogenated aromatic petroleum resin | Partially hydrogenated product (Softening point 115° C.) | 80 | 80 | 80 | — | — |
| | Fully hydrogenated product (Softening point 115° C.) | — | — | — | 120 | 120 |
| | Fully hydrogenated product (Softening point 125° C.) | — | — | — | — | — |
| Test1 | 180 degree peel strength@RT | 7 | 6 | 16 | 14 | 19.8 |
| Test2 | 180 degree peel strength@80° C. | 4 | 3 | 6 | 30 | 4 |
| Test3 | 90 degree peel@80° C. · 24 hr | ≥50 | ≥50 | ≥50 | ≥50 | ≥50 |

Evaluation 2: Study on Tackifier

Example 2-1 to Example 2-9

Sheets for evaluation were prepared in the same manner as in "Evaluation 1" and evaluated in the same manner as in "Evaluation 1", except that the formulation of the hot melt adhesive was changed as shown in Table 2. Herein, evaluation was performed using a hydrogenated rosin-based resin and a hydrogenated terpene resin in addition to an aromatic petroleum resin (alicyclic saturated hydrocarbon resin) having different degrees of hydrogenation used in Example 1-1. The details of these tackifiers are shown in Table 2.

TABLE 2

| | | Ex. 2-1 | Ex. 2-2 | Ex. 2-3 | Ex. 2-4 | Ex. 2-5 | Ex. 2-6 | Ex. 2-7 | Ex. 2-8 | Ex. 2-9 |
|---|---|---|---|---|---|---|---|---|---|---|
| Rubber component | Styrene ratio | 30% | 30% | 30% | 30% | 30% | 30% | 30% | 30% | 30% |
| | Molecular weight (×10^5) | 2.6 | 2.6 | 2.6 | 2.6 | 2.6 | 2.6 | 2.6 | 2.6 | 2.6 |
| | Number of added parts | 100 | 100 | 100 | 100 | 100 | 100 | 100 | 100 | 100 |
| Hydrogenated aromatic petroleum resin | Partially hydrogenated product (Softening point 115° C.) | 80 | — | — | 120 | — | — | — | — | — |
| | Fully hydrogenated product (Softening point 115° C.) | — | 80 | — | — | 120 | — | — | — | — |
| | Fully hydrogenated product (Softening point 125° C.) | — | — | 80 | — | — | 120 | — | — | — |
| Hydrogenated rosin-based resin (Softening point 125° C.) | | — | — | — | — | — | — | 80 | 120 | — |
| Hydrogenated terpene-based (Softening point 125° C.) | | — | — | — | — | — | — | — | — | 80 |
| Test1 | 180 degree peel strength@RT | 15 | 14 | 13 | 10 | 20 | 16 | 15 | 17 | 10 |
| Test2 | 180 degree peel strength@80° C. | 6 | 11 | 13 | 11 | 12 | 14 | 12 | 11 | 9 |
| Test3 | 90 degree peel@80° C. · 24 hr | 0 | 1 | 0 | 0 | 0 | 0 | ≥50 | ≥50 | 21 |

Another evaluation was performed separately from the above evaluations using a polymerized rosin resin and a disproportionated rosin resin as a tackifier, and it could be confirmed that the peel strength is lower than the result using a hydrogenated rosin-based resin. Still another evaluation was performed separately from the above evaluations using a terpene resin which had not been hydrogenated as a tackifier, and it could be confirmed that the peel strength is lower than the result using a hydrogenated terpene resin.

The above results show that the present invention can provide a hot melt adhesive sheet that exhibits excellent adhesion even if an adherend is a molded article or the like made of a polyolefin-based resin, and hence can provide a decorative sheet with adhesive layer that is applicable to a wide range of products.

REFERENCE SIGNS LIST

1: Decorative sheet with adhesive layer
10: Decorative sheet
20: Adhesive layer
P: Polypropylene resin plate
S: Strip-shaped sample

The invention claimed is:

1. A hot melt adhesive sheet comprising an adhesive layer consisting only of a hot melt adhesive, wherein the hot melt adhesive consists only of a styrene-ethylene-ethylene-propylene-styrene block copolymer and a hydrogenated aromatic petroleum resin as a tackifier.

2. The hot melt adhesive sheet according to claim 1, wherein
a content of the hydrogenated aromatic petroleum resin in the hot melt adhesive based on 100 mass parts of the styrene-ethylene-ethylene-propylene-styrene block copolymer is 70 mass parts or more and 140 mass parts or less.

3. A decorative sheet with adhesive layer having an adhesive layer formed on one side of a decorative sheet, wherein
the adhesive layer consists only of a hot melt adhesive,
the hot melt adhesive consists only of a styrene-ethylene-ethylene-propylene-styrene block copolymer and a hydrogenated aromatic petroleum resin as a tackifier.

4. The decorative sheet with adhesive layer according to claim 3 configured to be used for adhesion to an adherend in which at least a surface of the adherend, to which the adhesive layer is adhered, is composed of a resin composition comprising a polypropylene resin.

5. The decorative sheet with adhesive layer according to claim 3, wherein
a content of the hydrogenated aromatic petroleum resin in the hot melt adhesive based on 100 mass parts of the styrene-ethylene-ethylene-propylene-styrene block copolymer is 70 mass parts or more and 140 mass parts or less.

* * * * *